United States Patent
Tan

(10) Patent No.: US 10,185,370 B2
(45) Date of Patent: Jan. 22, 2019

(54) VIBRATION REDUCTION DEVICE, ELECTRONIC DEVICE AND MOBILE EQUIPMENT CONTAINING SAME

(71) Applicant: 3M INNOVATIVE PROPERTIES COMPANY, St. Paul, MN (US)

(72) Inventor: Di Tan, Shenzhen (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/525,414

(22) PCT Filed: Dec. 2, 2015

(86) PCT No.: PCT/US2015/063307
§ 371 (c)(1),
(2) Date: May 9, 2017

(87) PCT Pub. No.: WO2016/099872
PCT Pub. Date: Jun. 23, 2016

(65) Prior Publication Data
US 2017/0322602 A1    Nov. 9, 2017

(30) Foreign Application Priority Data

Dec. 15, 2014 (CN) .......................... 2014 1 0773053

(51) Int. Cl.
*F16F 15/02* (2006.01)
*G06F 1/18* (2006.01)
(Continued)

(52) U.S. Cl.
CPC ............ *G06F 1/182* (2013.01); *F16B 5/0241* (2013.01); *F16B 5/0258* (2013.01); *F16F 1/021* (2013.01);
(Continued)

(58) Field of Classification Search
CPC ..... F16L 55/035; B60R 16/0215; F16F 15/08; F16F 1/373; F16F 1/38; F16F 1/3849
See application file for complete search history.

(56) References Cited

U.S. PATENT DOCUMENTS

| | | | |
|---|---|---|---|
| 6,641,093 | B2 | 11/2003 | Coudrais |
| 9,562,587 | B2 | 2/2017 | Pichel |

(Continued)

FOREIGN PATENT DOCUMENTS

| | | |
|---|---|---|
| CN | 201285657 | 8/2009 |
| CN | 202034050 | 11/2011 |

(Continued)

OTHER PUBLICATIONS

International Search Report for PCT International Application No. PCT/US2015/063307, dated Feb. 29, 2016, 5 pages.

*Primary Examiner* — Bradley Duckworth
(74) *Attorney, Agent, or Firm* — Robert S. Moshrefzadeh

(57) ABSTRACT

The present disclosure relates to a vibration reduction device, an electronic device and mobile equipment containing same. The vibration reduction device comprises: a first fixing component (10) which is a frame structure (11); a second fixing component (100) arranged in the center or near the center position of the first fixing component (10); and a vibration reduction connecting component (50) positioned between the first fixing component (10) and the second fixing component (100) and used for connecting both together. The vibration reduction connecting component (50) comprises a vibration reduction connecting frame (53) connected to the frame structure (11), and an inverted U-shaped structure (51) positioned in the vibration reduction connecting frame (53), connected to the lower part of the vibration reduction connecting frame (53) through supporting legs and connected with the second fixing component (100). The vibration reduction device of the present disclo- (Continued)

sure can provide excellent vibration reduction and impact-prevention protection for electronic products and precision electronic equipment. It is especially able to protect electronic products and precision electronic equipment installed on mobile equipment, such as a vehicle, against physical damage while under severe travelling conditions, as well as ensure their normal operation. The vibration reduction device according to the present disclosure not only has a simple structure and occupies little space, but also has simple installation and long service life, and can be suitable for varying load conditions.

13 Claims, 7 Drawing Sheets

(51) Int. Cl.
    *F16B 5/02*     (2006.01)
    *F16F 15/06*     (2006.01)
    *F16F 1/02*     (2006.01)
    *F16F 1/36*     (2006.01)
    *F16F 15/04*     (2006.01)
    *G06F 1/16*     (2006.01)
    *G11B 33/08*     (2006.01)
    *B60R 16/023*     (2006.01)

(52) U.S. Cl.
    CPC .............. *F16F 1/025* (2013.01); *F16F 1/36* (2013.01); *F16F 15/046* (2013.01); *F16F 15/06* (2013.01); *G06F 1/1658* (2013.01); *G06F 1/187* (2013.01); *B60R 16/0239* (2013.01); *F16F 2230/0005* (2013.01); *G11B 33/08* (2013.01)

(56) References Cited

U.S. PATENT DOCUMENTS

| | | |
|---|---|---|
| 2004/0144897 A1 | 7/2004 | Maruyama |
| 2004/0217236 A1 | 11/2004 | Shibuya |
| 2010/0264572 A1* | 10/2010 | Konkle .................. F16F 1/38 267/182 |
| 2012/0235333 A1* | 9/2012 | Suzuki ................ F16F 1/3849 267/141 |
| 2014/0070070 A1* | 3/2014 | Shinoda .................... F16F 7/12 248/634 |
| 2014/0103187 A1* | 4/2014 | Kim ..................... F16F 1/3828 248/638 |
| 2014/0159289 A1 | 6/2014 | Loewe |
| 2014/0299723 A1* | 10/2014 | Kato .................... F16L 3/2235 248/74.4 |
| 2015/0129742 A1* | 5/2015 | Okanaka ............. B60K 5/1208 248/634 |
| 2015/0276010 A1* | 10/2015 | Nakamura .............. F16F 15/08 248/634 |
| 2016/0053848 A1* | 2/2016 | Nakamura ............ F16F 1/3842 248/634 |
| 2017/0211648 A1* | 7/2017 | Kadowaki ................ F16F 1/36 |
| 2017/0321775 A1* | 11/2017 | Sato ....................... F16F 15/08 |
| 2017/0343072 A1* | 11/2017 | Kaneko ..................... F16F 1/38 |
| 2018/0031069 A1* | 2/2018 | Kuroda ............... B60K 5/1208 |

FOREIGN PATENT DOCUMENTS

| | | |
|---|---|---|
| CN | 202215654 | 5/2012 |
| GB | 2166794 | 5/1986 |

* cited by examiner

VIBRATION REDUCTION DEVICE, ELECTRONIC DEVICE AND MOBILE EQUIPMENT CONTAINING SAME

TECHNICAL FIELD

The present disclosure relates to a vibration reduction device. The present disclosure also relates to an electronic device and mobile equipment containing the vibration reduction device.

BACKGROUND ART

With the development of science and technology, more and more electronic products and precision electronic equipment are merged into the daily life of people. Electronic products and/or precision electronic equipment such as Digital Video Recorders (DVR) and the like can especially be widely applied to mobile vehicles such as buses, long-distance passenger transportation vehicles, school buses, shop trucks, container trucks, tourist buses, logistics freight cars, law enforcement vehicles for police, trains, metros, ships, aircrafts and the like for performing audio and video synchronous recording, global positioning, wireless audio-visual real-time transmission and the like, thereby providing more convenience for the lives of people. However, under many conditions, the electronic products and/or the precision electronic equipment may be loaded on a mobile machine and equipment, and the machine and the equipment will inevitably bump due to road conditions and the like and cause vibration in the moving process. The electronic products and/or precision electronic equipment can often be very sensitive to vibration and impact, and may be damaged by excessive vibration.

To solve the vibration reduction problem of the electronic products and/or precision electronic equipment in the mobile machine and/or equipment, many products have been developed in the industry, including such products as a spring vibration reduction structure, wire rope vibration reduction structure, hydraulic vibration reduction structure and the like.

CN202034050U discloses a hard disk vibration reduction device. The hard disk vibration reduction device comprises an internal fixing sheet, an external fixing sheet and a Z-shaped vibration reduction block, wherein the Z-shaped vibration reduction block comprises rubber fixing blocks respectively sleeved on the internal fixing sheet and the external fixing sheet, and a metal connecting sheet connected between the rubber fixing blocks. By using the deformable performance of the rubber material of the fixing blocks, after fixed connection with the hard disk vibration reduction device, the action of protecting a hard disk against vibration damage is performed in the movement of the vehicles. The hard disk vibration reduction device is generally suitable for a single-hard-disk DVR vibration reduction solution, and a set resonant frequency is obtained under a set load.

CN201285657Y discloses a hard disk vibration isolation device. The hard disk vibration isolation device comprises an upper fixing cover and a lower fixing plate fixedly connected together to form an empty box shape capable of accommodating a hard disk. A plurality of square foam vibration isolation pads and rubber sheaths are arranged on the inner peripheral wall of the empty box shape for covering the accommodated hard disk so as to perform the action of vibration isolation.

CN202215654U discloses an oil-impregnated vibration reducer. The oil-impregnated vibration reducer comprises a vibration reducer body. A bottom cover is welded on the bottom end of the vibration reducer body. The vibration reducer body consists of a hard rubber polypropylene middle ring and soft rubber arranged on the top end of the hard rubber polypropylene middle ring. The soft rubber comprises an upper soft rubber ring and a lower soft rubber ring connected mutually. The external diameter of the upper soft rubber ring is smaller than the external diameter of the lower soft rubber ring, and the external diameter of the lower soft rubber ring is smaller than the external diameter of the hard rubber polypropylene middle ring. A cylindrical groove is arranged in the middle of the top end of the upper soft rubber ring, and damping oil is impregnated in the vibration reducer body.

However, there is still an urgent need for a device not only having a simple structure and occupying little space, but also having simple installation and long service life, suitable for varying load conditions and capable of providing excellent vibration reduction and impact prevention protection for electronic products and precision electronic equipment.

SUMMARY OF THE INVENTION

The present disclosure provides a vibration reduction device which can provide excellent vibration reduction and impact prevention protection for electronic products and precision electronic equipment. The vibration reduction device is especially able to protect electronic products and precision electronic equipment installed on mobile equipment, such as a vehicle, against physical damage while under severe travelling conditions, as well as ensure their normal operation. The vibration reduction device according to the present disclosure not only has simple structure and occupies little space, but also has simple installation and long service life, and can be suitable for varying load conditions.

According to one aspect of the present disclosure, a vibration reduction device is provided, comprising: a first fixing component which is a frame structure; a second fixing component arranged in the center or near the center position of the first fixing component; and a vibration reduction connecting component positioned between the first fixing component and the second fixing component and used for connecting both together, wherein the vibration reduction connecting component comprises: a vibration reduction connecting frame connected to the frame structure, and an inverted U-shaped structure positioned in the vibration reduction connecting frame and connected to the lower part of the vibration reduction connecting frame through supporting legs; and moreover, the inverted U-shaped structure is connected with the second fixing component.

According to certain embodiments, the first fixing component has installing holes respectively in the upper part and the lower part of the frame structure of the first fixing component; the second fixing component is a column body having a through hole for installation; and the shape of the vibration reduction connecting frame is almost consistent with the frame structure of the first fixing component.

According to certain embodiments, a center hole used for receiving the second fixing component is formed at the crown of the inverted U-shaped structure.

According to certain embodiments, lug bosses are respectively formed on the upper part and the lower part of the frame structure and the installing holes penetrate through the lug bosses.

According to certain embodiments, at least one vibration reduction rib is formed on the end surface of one end or both ends of the side wall of the center hole.

According to certain embodiments, at least one vibration reduction rib is formed on the end surface of one end or both ends of the vibration reduction connecting frame.

According to certain embodiments, the frame structure of the first fixing component is roughly circular, and the vibration reduction connecting frame of the vibration reduction connecting component is also roughly circular; and meanwhile, through-holes are formed in the upper part and the lower part of the vibration reduction connecting frame in positions corresponding to the installing holes of the frame structure.

According to certain embodiments, the frame structure of the first fixing component is roughly circular, and the vibration reduction connecting frame of the vibration reduction connecting component is a two-segment arc structure connected with the supporting legs of the inverted U-shaped structure.

According to certain embodiments, the frame structure of the first fixing component is roughly circular, and the vibration reduction connecting frame of the vibration reduction connecting component is an incomplete circular structure having a notch on the upper part or the lower part.

According to certain embodiments, the vibration reduction connecting component also comprises an external vibration reduction connecting piece, and the external vibration reduction connecting piece is connected to the vibration reduction connecting frame through a plurality of middle connecting columns which penetrate through the holes formed in the frame structure of the first fixing component.

According to certain embodiments, the first fixing component and the second fixing component are made of material selected from metal, alloy, hard plastics and hard rubber, and the vibration reduction connecting component is made of material selected from soft elastic metal and soft elastic rubber.

According to certain embodiments, the vibration reduction connecting component is formed in one step through a hot pressing molding and metal bonding process onto the first fixing component and the second fixing component.

According to certain embodiments, the junction surfaces of the material of the vibration reduction connecting component with the materials of the first fixing component and the second fixing component are bonded with a chemical reagent.

According to another aspect of the present disclosure, an electronic device is provided, wherein the electronic device comprises: an electronic device body; a housing, used for accommodating the electronic device body; and the vibration reduction device mentioned above, wherein the vibration reduction device is arranged between the electronic device body and the housing.

According to still another aspect of the present disclosure, mobile equipment is provided, wherein the mobile equipment comprises the electronic device mentioned above.

Because the inverted U-shaped vibration reduction structure in the above frame is adopted, the vibration reduction device according to the present disclosure can ensure that response frequencies in three directions of X, Y and Z of the electronic device are very low at rated load, thereby providing a tremendous protective region for the electronic device.

By means of the inverted U-shaped vibration reduction structure, the vibration reduction device according to the present disclosure enables the deformation displacements of the electronic device in three directions of X, Y and Z to be very small, thereby greatly saving the internal space of a product.

The vibration reduction device according to the present disclosure is simple in installation and only fasteners (such as screws, bolts and the like) are needed for fixation and connection.

In addition, the vibration reduction device according to the present disclosure can be installed as required to realize the installation requirement of any direction of three directions of X, Y and Z of the housing of the electronic device.

Furthermore, because the second fixing component is configured in the inverted U-shaped structure, the vibration reduction device according to the present disclosure can prevent the vibration reduction portion made of softer material (such as rubber) from directly rubbing against the fasteners (such as screws, bolts and the like), usually made of metal or alloy material, for fixing the electronic device. Therefore, the service life of the vibration reduction portion can be prolonged.

BRIEF DESCRIPTION OF THE DRAWINGS

Other features and advantages of the present disclosure can be understood more clearly from the following more detailed description in combination with the drawings which show the principle of the present disclosure by way of embodiments.

DETAILED DESCRIPTION OF THE EMBODIMENTS

Figure 1A:
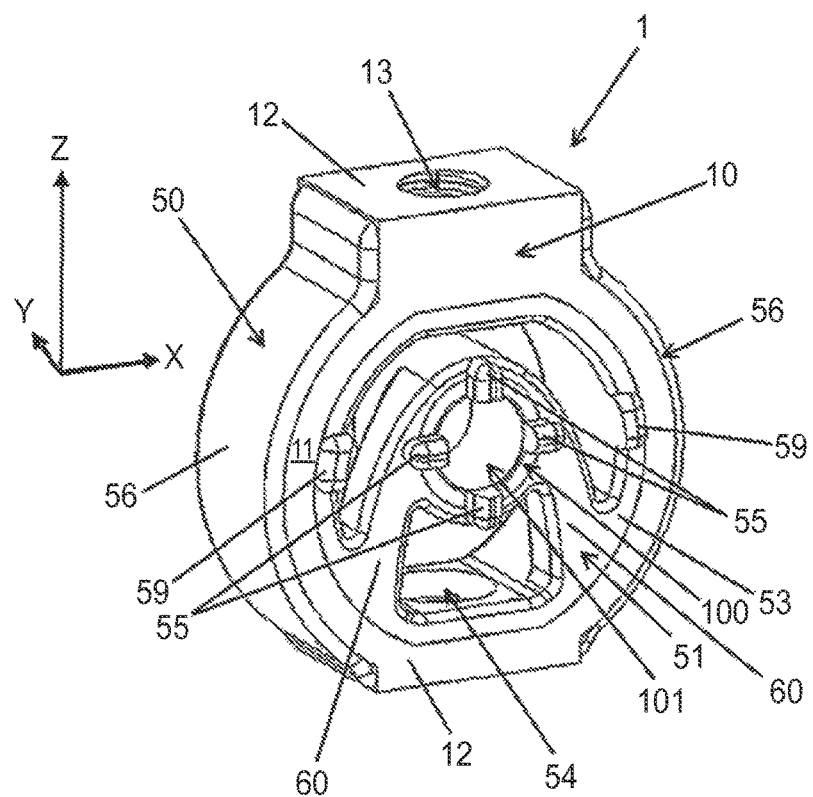
FIG. 1A is a stereoscopic diagram of a vibration reduction device according to certain specific embodiments of the present disclosure.

The embodiments of the present disclosure are shown in the drawings for performing illustration. However, those skilled in the art can understand that the present disclosure is not limited to precise arrangement and devices shown therein. According to the description, those skilled in the art will know various variations and modifications within the spirit and the scope of the present disclosure.

The vibration reduction device, the electronic device containing same and the mobile equipment according to the present disclosure will be described below with reference to the drawings. It should be noted that the drawings are not shown in a precise proportion. Orientation terms, such as "upper", "lower", "left", "right", "front", "back" and the like, mentioned in the article are in accordance with the drawing layout, and are only for the convenience of description, rather than a limitation to the present disclosure. In addition, for the definitions of X direction, Y direction and Z direction in the drawing layout, see FIG. 1A and FIG. 2A. In the drawings, similar components are expressed by similar drawing references.

In general, the vibration reduction device of the present disclosure comprises: a first fixing component, a second fixing component arranged in the center or near the center position of the first fixing component, and a vibration reduction connecting component positioned between the first fixing component and the second fixing component, wherein the first fixing component is used for connection to a structure such as a housing, the second fixing component is used for connection to electronic equipment such as a hard disk, and the vibration reduction connecting component is used for vibration reduction. Specifically, the first fixing component is a frame structure, has installing holes respectively in the upper part and the lower part of the frame structure, and therefore is fixed to the structure such as the housing through screws which penetrate through the installing holes. According to certain specific embodiments, lug bosses are respectively formed on the upper part and the lower part of the frame structure and the installing holes penetrate through the lug bosses. The second fixing component is a column body, and is a cylinder according to certain specific embodiments. A through hole for installation is formed in the cylinder and is used for the screws to penetrate so as to fix the vibration reduction device to the electronic equipment. The vibration reduction connecting component is configured between the first fixing component and the second fixing component, and is used for connecting both together.

Figure 1B:
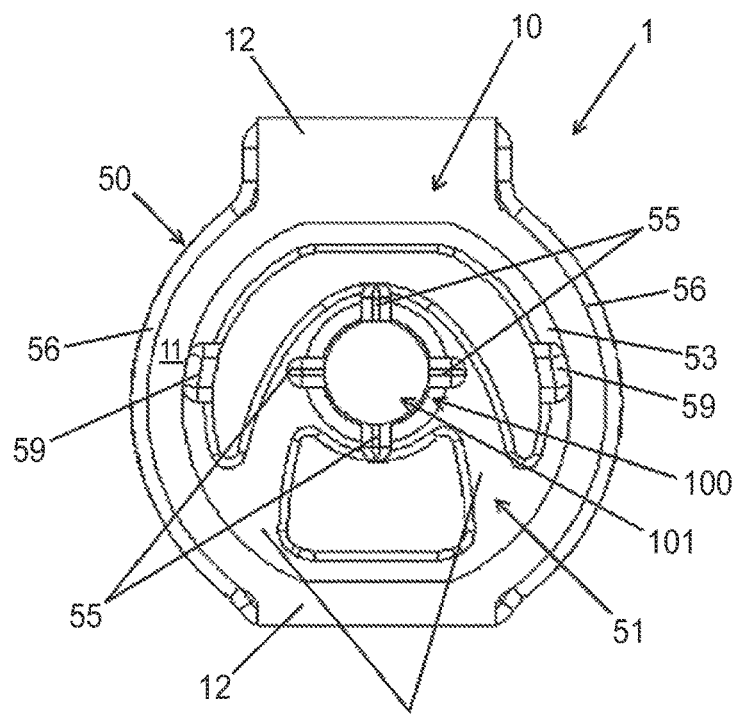
FIG. 1B is a front view of the vibration reduction device shown in FIG. 1A.
Figure 1C:
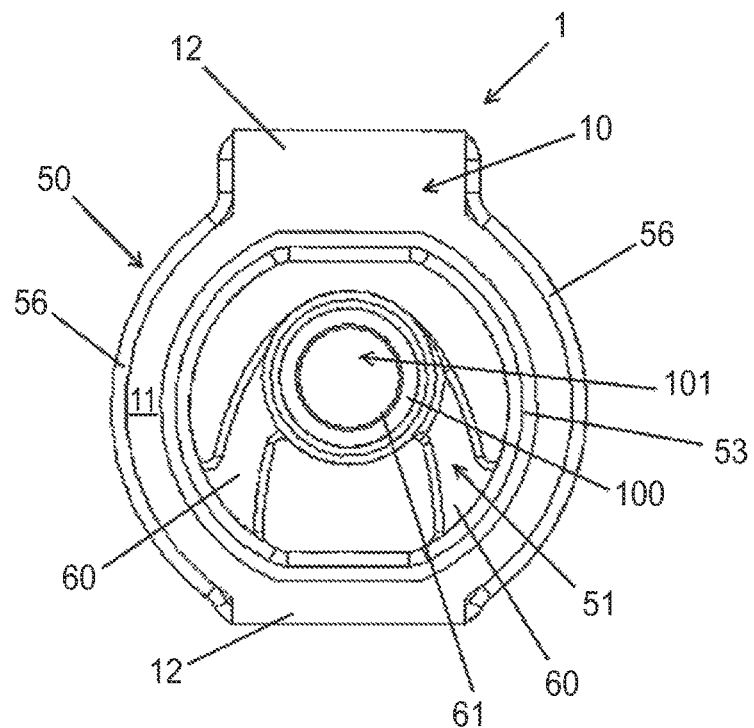
FIG. 1C is a back view of the vibration reduction device shown in FIG. 1A.
Figure 1D:
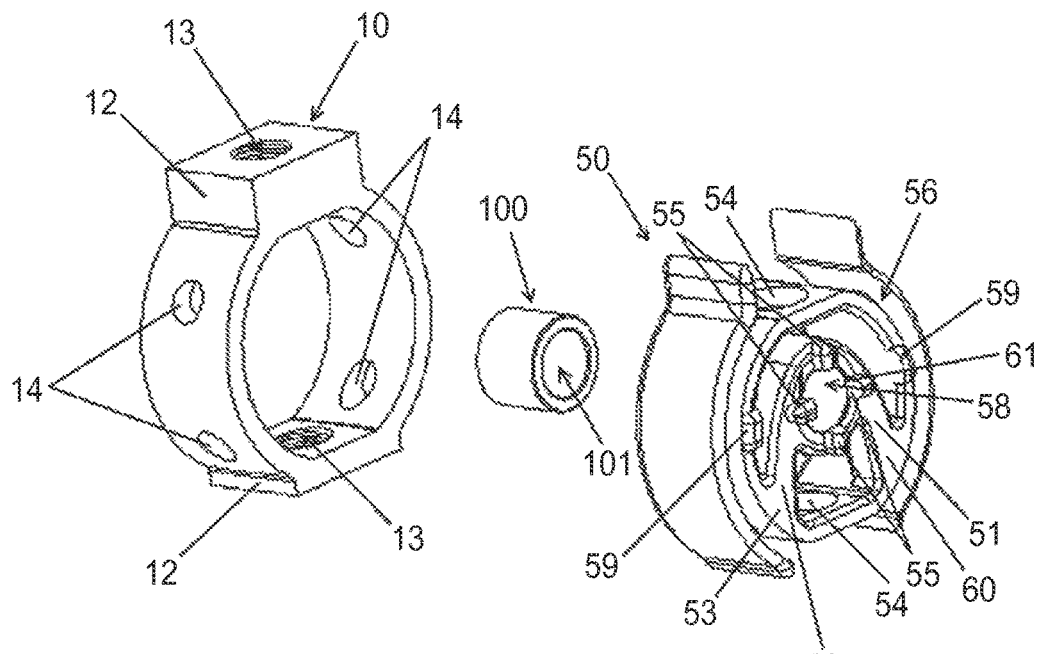
FIG. 1D is a stereoscopic breakdown diagram of the vibration reduction device shown in FIG. 1A.

FIG. 1A shows a stereoscopic diagram of a vibration reduction device 1 according to certain specific embodiments of the present disclosure, FIG. 1B and FIG. 1C show a front view and a back view of the vibration reduction device shown in FIG. 1A, and FIG. 1D shows a stereoscopic breakdown diagram of the vibration reduction device shown in FIG. 1A. As shown in the figures, the vibration reduction device 1 comprises: a first fixing component 10, a second fixing component 100 arranged in the center position of the first fixing component 10, and a vibration reduction connecting component 50 positioned between the first fixing component 10 and the second fixing component 100.

Figure 1E:
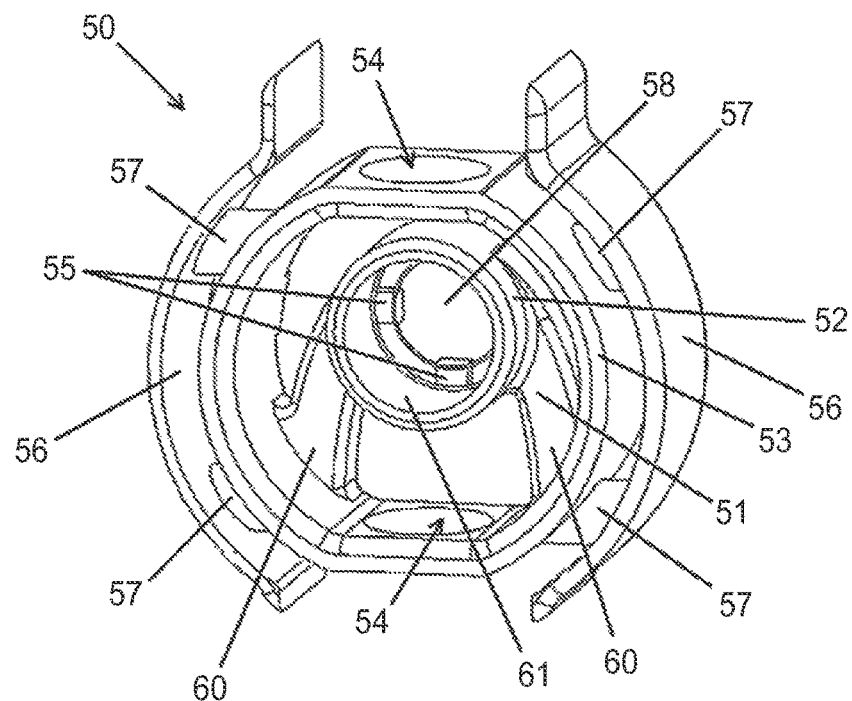
FIG. 1E is a stereoscopic diagram of a vibration reduction connecting component of the vibration reduction device shown in FIG. 1A.
Figure 1F:
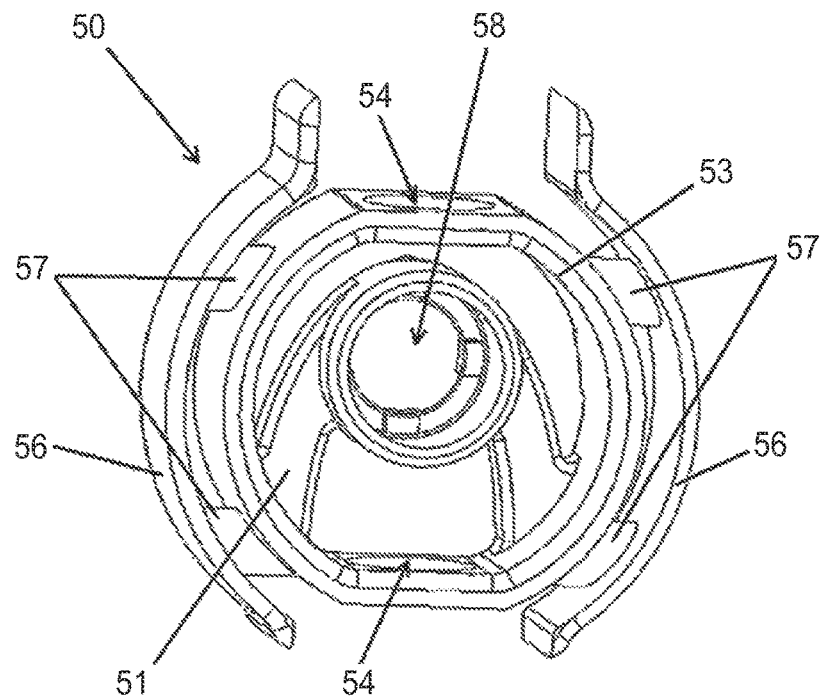
FIG. 1F is a stereoscopic diagram, seen from another direction, of the vibration reduction connecting component of the vibration reduction device shown in FIG. 1A.

As more clearly shown in FIG. 1D to FIG. 1E, the first fixing component 10 is a frame structure 11, has installing holes 13 respectively in the upper part and the lower part of the frame structure 11, and therefore is fixed to the structure such as the housing through the screws which penetrate through the installing holes 13. According to certain specific embodiments, lug bosses 12 are respectively formed on the upper part and the lower part of the frame structure 11 and the installing holes 13 penetrate through the lug bosses 12. Therefore, the frame structure 11 can be more conveniently installed on the structure such as the housing. The second fixing component 100 arranged in the center position of the first fixing component 10 is a column body, and is a cylinder according to certain specific embodiments. A through-hole 101 for installation is formed in the middle and is used for the screws to pass so as to fix the vibration reduction device to the electronic equipment. Certainly, those skilled in the art can understand that the second fixing component 100 is not limited to the cylinder, and can also be a prism, a square column body and the like. The vibration reduction connecting component 50 comprises a vibration reduction connecting frame 53 and an inverted U-shaped structure 51 positioned in the vibration reduction connecting frame 53. The vibration reduction connecting frame 53 is used for connection to the inner side of the frame structure 11 of the first fixing component 10. Two supporting legs 60 of the inverted U-shaped structure 51 are connected to the lower part of the vibration reduction connecting frame 53, and a center hole 58 is formed at the crown 52 of the inverted U-shaped structure 51, and used for receiving the second fixing component 100. According to certain specific embodiments, at least one vibration reduction rib 55 is formed on the end surface of one end or both ends of the side wall 61 of the center hole 58 to assist in alleviating vibration. According to certain specific embodiments, at least one vibration reduction rib 59 is formed on the end surface of one end or both ends of the vibration reduction connecting frame 53 to assist in alleviating vibration.

According to certain specific embodiments shown in FIG. 1A to FIG. 1F, the frame structure 11 of the first fixing component 10 is roughly circular. However, those skilled in the art can understand that the frame structure 11 is not limited to be roughly circular, and can be any other appropriate shapes, such as square frame, long square frame, trapezoid frame and irregular frame as long as the frame structure 11 can be used for fixation to the housing. In the cases of the square frame, the long square frame and the trapezoid frame, the installing holes for the screws to pass can be directly formed in the upper part and the lower part of the frame structure without the need of processing the lug bosses.

According to certain specific embodiments shown in FIG. 1A to FIG. 1F, the shape of the vibration reduction connecting frame 53 of the vibration reduction connecting component 50 is consistent with the frame structure 11 of the first fixing component 10, and is also roughly circular in the embodiment so as to connect with the frame structure 11 of the first fixing component 10 together from the inside. Through-holes 54 are formed in the upper part and the lower part of the vibration reduction connecting frame 53 in positions corresponding to the installing holes 13 of the frame structure 11, for the screws to penetrate. However, those skilled in the art can understand that the vibration reduction connecting frame 53 is also not limited to be roughly circular in shape, and can be a two-segment arc structure connected with two supporting legs 60 of the inverted U-shaped structure 51 (at this moment, the through-holes corresponding to the installing holes 13 are not required to be arranged), can be an incomplete circular structure (for example, a notch exists on the upper part or the lower part of the circular structure), and can also be any appropriate shape matched with the frame structure 11, such as square frame, long square frame, trapezoid frame, irregular frame and the like, as long as the shape of the vibration reduction connecting frame 53 can be connected with the frame structure 11 of the first fixing component 10 together from the inside and fix the inverted U-shaped structure 51.

According to certain specific embodiments, the vibration reduction connecting component 50 can also have an external vibration reduction connecting piece 56, and the external vibration reduction connecting piece 56 is connected to the vibration reduction connecting frame 53 through a plurality of middle connecting columns 57. In the assembled vibration reduction device 1, the middle connecting columns 57 penetrate through the through-holes 14 formed in the corresponding positions of the frame structure 11 of the first fixing component 10; thus, the inverted U-shaped structure 51 is firmly connected to the frame structure 11 of the first fixing component 10 through the vibration reduction connecting frame 53 and the external vibration reduction connecting piece 56; the resonant frequency range of the whole vibration reduction device 1 is ensured; and the deformation displacements in three directions of X, Y and Z are limited so that the internal space for installing the electronic device of the vibration reduction device 1 is greatly saved.

The first fixing component 10 and the second fixing component 100 of the vibration reduction device 1 according to the present disclosure are usually made of different and/or identical material. The first fixing component 10 and the second fixing component 100 can be made of material like metal, alloy, hard plastics and hard rubber. The vibration reduction connecting component 50 can be made of material of soft elastic metal, soft elastic rubber and the like. In addition, the second fixing component 100 can be made of material of which the hardness is higher than that of the vibration reduction connecting component 50, such as material like metal, alloy, hard plastics and hard rubber. According to certain specific embodiments, the first fixing component 10 and the second fixing component 100 are made of metal or alloy, and the vibration reduction connecting component 50 is made of rubber. Certainly, the present disclosure is not limited thereto, and those skilled in the art can consider other materials for making the components and identical and/or different combinations of the materials among the components according to the creative conception of the present disclosure. According to certain specific embodiments, the vibration reduction connecting component 50 is formed in one step through a hot pressing molding and metal bonding process onto the first fixing component 10 and the second fixing component 100. According to certain specific embodiments, the junction surfaces of the rubber material of the vibration reduction connecting component 50 with the metal or alloy materials of the first fixing component 10 and the second fixing component 100 are subject to metal or alloy bonding processing with a chemical reagent; and meanwhile, with the combination of the arrangement of the middle connecting columns 57, the vibration reduction connecting component 50 can be firmly connected to the first fixing component 10 for preventing the vibration reduction connecting component 50 from falling from the first fixing component 10.

The vibration reduction device according to the present disclosure can serve as a standard part suitable for various electronic products and/or precision electronic equipment. All kinds of electronic products and/or precision electronic equipment are generally accommodated in the housing, and the housing is also fixed to the mobile equipment such as vehicles and the like. If the electronic products and/or the precision electronic equipment can be directly connected to the housing, vibration, impact and the like will be directly transferred to the electronic products and/or precision electronic equipment due to vibration caused by emergency stops, bumps, and the like resulting from road conditions in the movement process of the mobile equipment, resulting in damage to the electronic products and/or the precision electronic equipment. The vibration reduction device of the present disclosure can be arranged between the electronic products and/or the precision electronic equipment and the housing, so as to reduce the vibration and the impact transferred to the electronic products and/or the precision electronic equipment by the mobile equipment and to perform the action of protecting the electronic products and/or the precision electronic equipment.

Figure 2A:
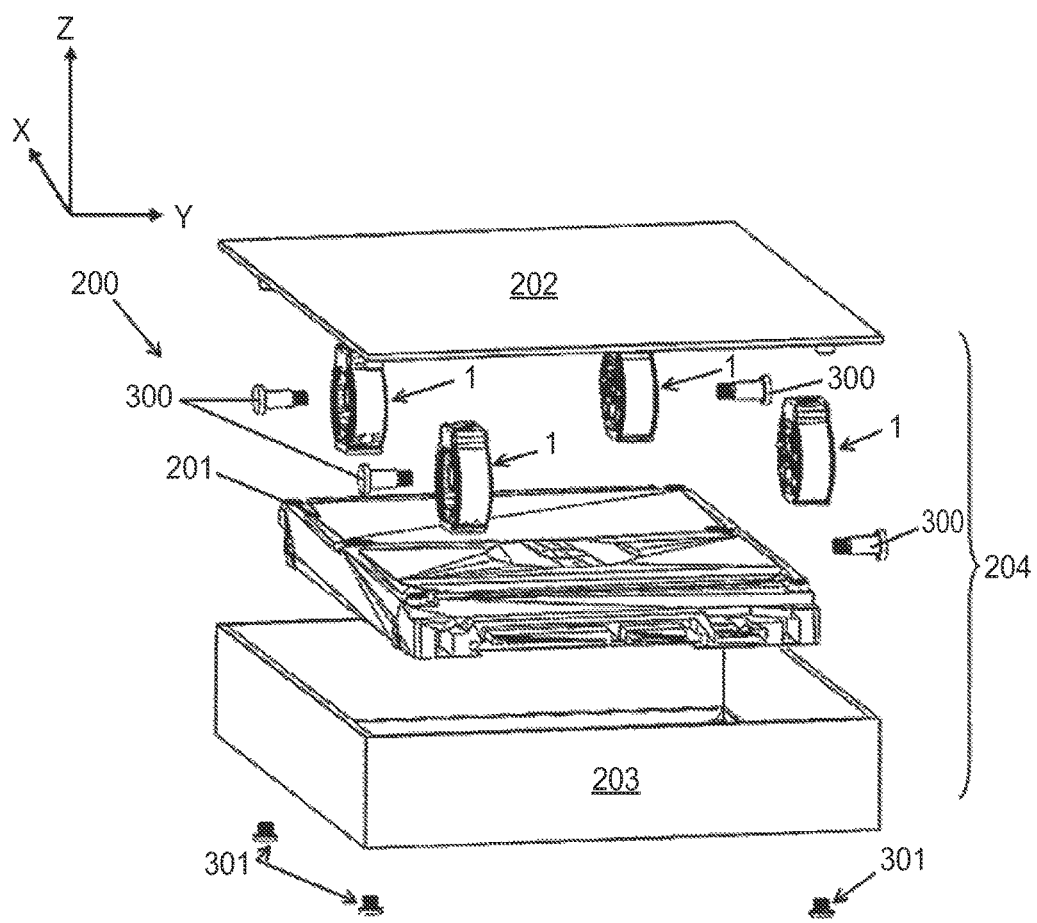
FIG. 2A shows a stereoscopic breakdown diagram in which the vibration reduction device according to the present disclosure is applied to an electronic device.
Figure 2B:
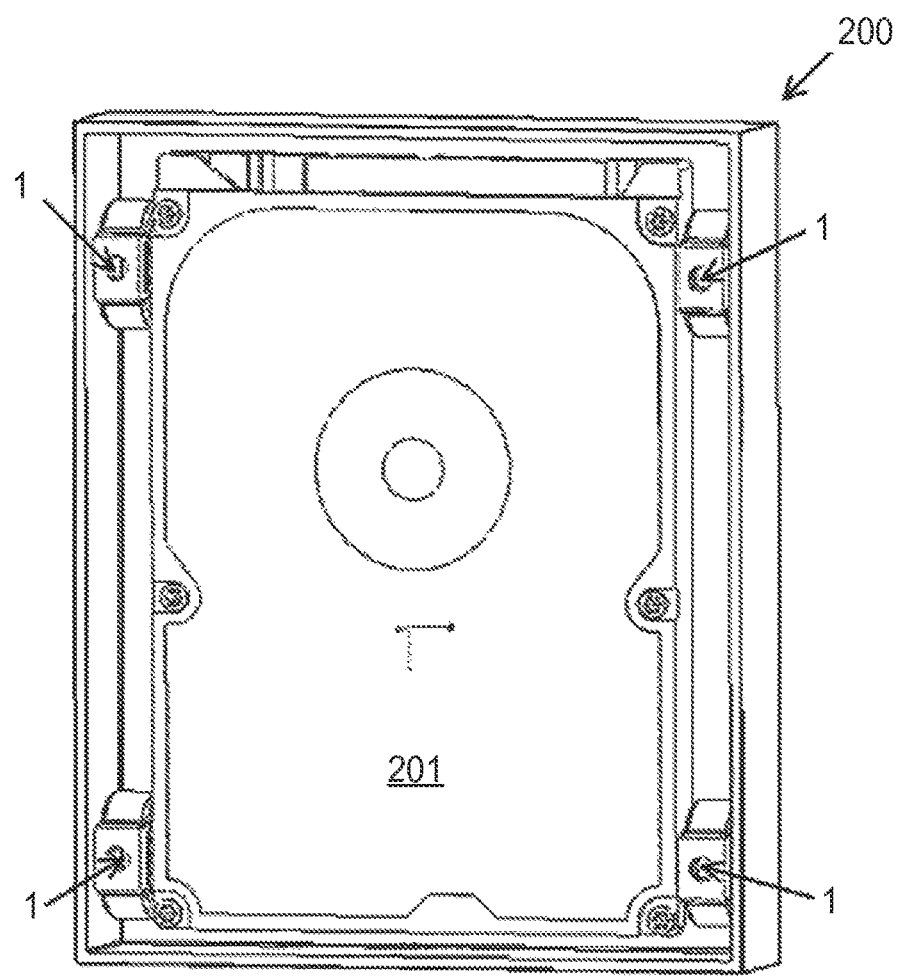
FIG. 2B shows a top view of FIG. 2A.
Figure 2C:
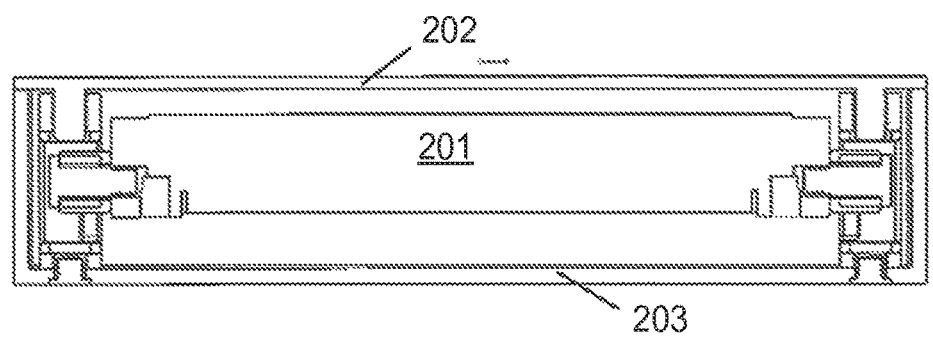
FIG. 2C shows a side view of FIG. 2A.

FIG. 2A shows a stereoscopic breakdown diagram in which the vibration reduction device 1 according to the present disclosure is installed in an electronic device 200. FIG. 2B and FIG. 2C respectively show a top view and a side view of FIG. 2A. In the exemplary embodiments shown in FIG. 2A to FIG. 2C, the electronic device 200 can be, for example, a hard disk, and the electronic device body 201 of the electronic device 200 is a rectangular parallelepiped. The reason for using the rectangular parallelepiped as an example is that currently, most of electronic products themselves are regular rectangular parallelepipeds or regular hexahedrons to facilitate installation and emplacement. However, the present disclosure is not only suitable for such electronic products with regular shapes, but also suitable for electronic products with irregular shapes as long as the electronic products have installing positions. The electronic device body 201 is accommodated in the housing 204. The housing 204 can be fixed to mobile equipment such as vehicles by way of fasteners (such as screws, bolts, rivets and the like), welding, or bonding. As shown in FIG. 2A, the housing 204 comprises a housing body 203 and a cover 202; and holes are formed in the bottom wall of the housing body 203 and the cover 202 in positions corresponding to the installing holes 13 of the first fixing component 10 of the vibration reduction device 1, and used for receiving the fasteners 301 such as screws so as to connect the housing 204 and the vibration reduction device 1. According to the factors of the travelling direction of the mobile equipment, the direction of vibration or impact and the like, the vibration reduction device 1 can be selected to be arranged between the electronic device body 201 and the inner wall of the housing 204 on two opposite sides of the electronic device body 201. Installing holes are respectively formed in two opposite sides, for installing the vibration reduction device 1, of the electronic device body 201. During installation, the fasteners 300 penetrate through the center hole 101 of the second fixing component 100 of the vibration reduction device 1 and extend into the corresponding installing holes of the electronic device body 201 so as to connect the vibration reduction device 1 to the electronic device body 201. As shown in FIG. 2A, four vibration reduction devices 1 are adopted in this application.

For a hard disk on which the vibration reduction device 1 of the present disclosure is installed, when the mobile equipment suddenly stops moving or is bumped, the vibration can be effectively absorbed or reduced by the vibration reduction device 1. For the convenience of narration, coordinate systems shown in FIG. 1A and FIG. 2A are set. The vibration reduction connecting frame 53 of the vibration reduction device 1 can limit the maximum displacement which may be generated in the vibration process so as to prevent the electronic device body 201 from directly impacting the housing 204.

Figure 3A:
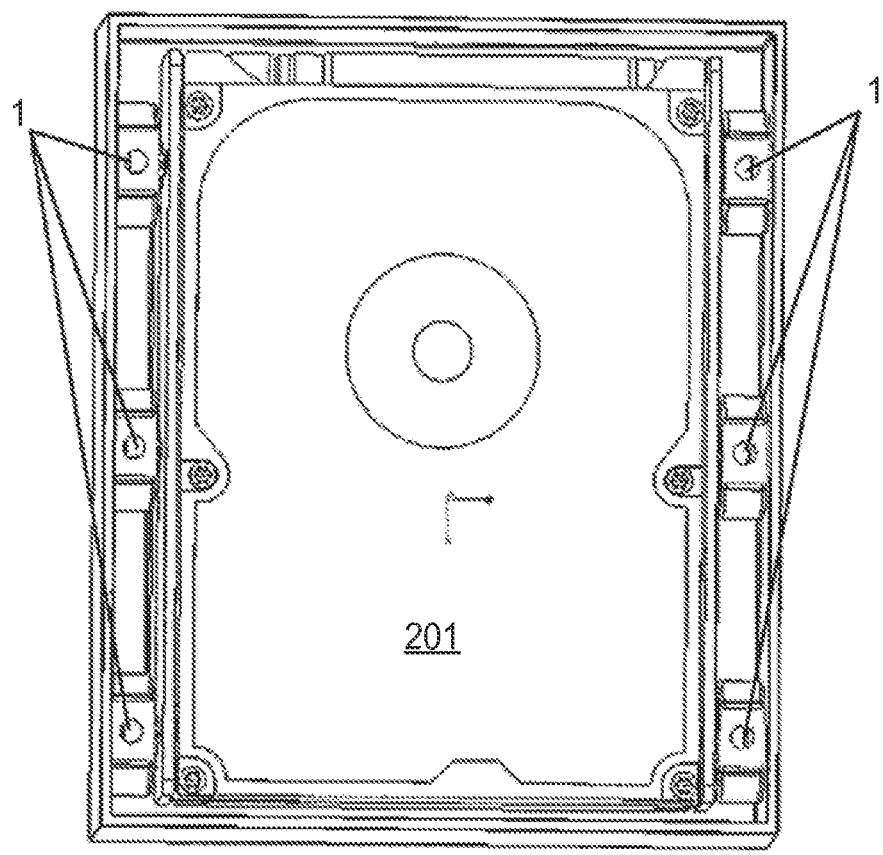
FIG. 3A shows a top view in which the vibration reduction device according to the present disclosure is applied to two electronic devices.
Figure 3B:
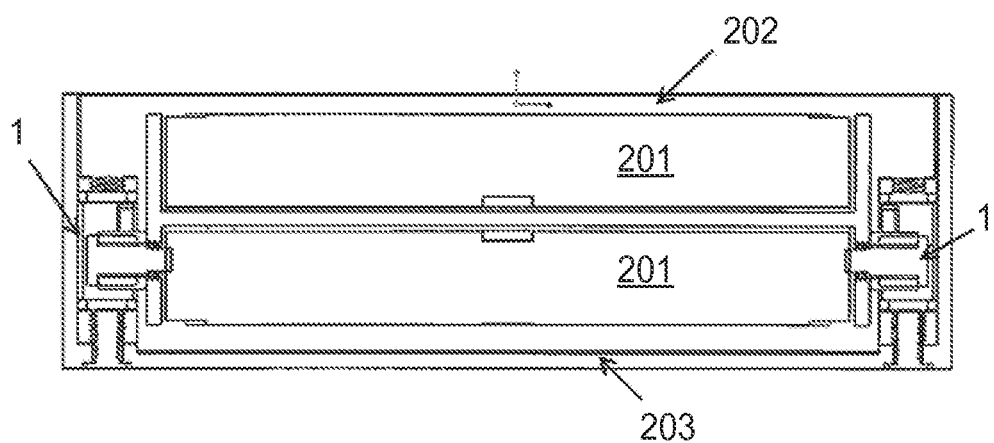
FIG. 3B shows a side view in which the vibration reduction device according to the present disclosure is applied to two electronic devices.

As previously mentioned, the vibration reduction device according to the present disclosure can serve as a standard part suitable for various electronic products and/or precision electronic equipment. More importantly, the vibration reduction device according to the present disclosure can be suitable for different loads. FIG. 3A shows a top view in which the vibration reduction device according to the present disclosure is applied to two electronic devices. FIG. 3B shows a side view in which the vibration reduction device according to the present disclosure is applied to two electronic devices. As shown in FIG. 3A, because applied to two electronic devices with heavier loads, six vibration reduction devices 1 are adopted in this application.

The inventor determines by a test that: for loads of 100 g, 150 g and 200 g, four vibration reduction devices are recommended to be adopted; and for loads of 300 g and 400 g, six vibration reduction devices are recommended to be adopted.

The vibration reduction effect by using the vibration reduction device of the present disclosure is excellent. Currently, the vibration reduction effect is tested in the art in accordance with "IEC 68-2-6 test method Fc and guidance: sinusoidal vibration". The purpose of IEC 68-2-6 test method is to provide a standard sinusoidal vibration test procedure for determining the mechanical vulnerability and the specific function degradation circumstance when a test specimen encounters simple harmonic vibration. The test method can also be used for deciding the integrality of a test specimen structure and/or researching dynamic characteristics, and can be suitable for elements, equipment or other products which encounter the simple harmonic vibration in the process of transportation or utilization. The sinusoidal vibration of a test specimen hard disk on which the vibration reduction device 1 according to the present disclosure is installed is tested in accordance with the IEC 68-2-6 test method Fc and guidance. The test process of the vibration reduction device of the present disclosure comprises the following steps:

performing visual inspection and electrical and mechanical inspection on the test specimen hard disk in accordance with the regulations of relevant specifications prior to the test;

performing the test in accordance with specifications and carrying out the test in another axial direction only after completing all of test work in one axial direction (definitions of the axial directions, and test level and time are in accordance with relevant specifications);

performing a functional test and all of measurement work in the test according to the regulations of relevant specifications;

terminating the test; and performing visual inspection and electrical and mechanical inspection after the test specimen hard disk is recovered to the same state prior to the test.

The structure of the vibration reduction device for the test is the same as the structures shown in FIG. 1A to FIG. 1F. The test specimen hard disk is fixed to a test platform in accordance with the regulation of IEC 68-2-6, with a load of 100 g (therefore, four vibration reduction devices are adopted). A clamping point and a control point are configured according to the regulations of relevant specifications. In the sine sweeping test with the test condition of an input of 1 g's, the sine sweeping vibration is from 20 Hz to 500 Hz and the sweeping rate is 1 Oct./min (one octave per minute). The vibration response frequency-vibration transmissibility curve shown in FIG. 4 and the maximum vibration transmissibility result in the vibration test shown in Table 1 are finally obtained.

TABLE 1

Vibration Test Result
Sine Sweeping of 20 Hz to 500 Hz

| | Test Specimen Hard Disk | | |
|---|---|---|---|
| Directions | Frequency (Hz) | Acceleration (g's) | Maximum Vibration Transmissibility |
| X direction | 11 | 1.85 | 1.85 |
| Y direction | 35 | 1.95 | 1.95 |
| Z direction | 47 | 1.59 | 1.59 |

Figure 4:
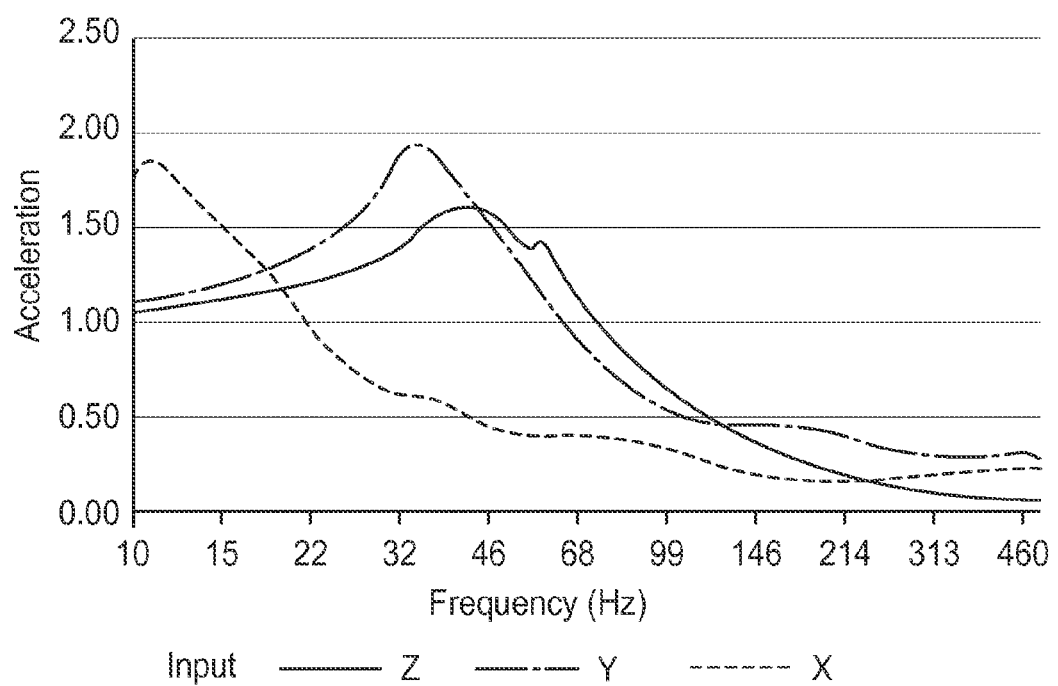
FIG. 4 is a response frequency-vibration transmissibility curve diagram obtained through a vibration reduction test method after the vibration reduction device according to the present disclosure is adopted.

FIG. 4 shows a result curve of the test specimen hard disk in sine sweeping of 20 Hz to 500 Hz at a sweeping rate of one octave per minute, wherein the transverse axis of the curve is response frequency and the longitudinal axis of the curve is vibration transmissibility. Seen from FIG. 4, because the inverted U-shaped structure 51 of the vibration reduction connecting component 50 of the vibration reduction device 1 presents different structures in X direction, Y direction and Z direction (see the coordinate system shown in FIG. 1A), the obtained vibration reduction results are slightly different: a curve peak in X direction appears earlier than curve peaks in Y direction and Z direction, i.e., appears in lower response frequency; and seen from the data in Table 1, the curve peak in X direction appears at 11 Hz, while the curve peaks in Y direction and Z direction appear later and respectively appear at 35 Hz and 47 Hz seen from the data in Table 1. The maximum vibration transmissibility in X direction is 1.85; the maximum vibration transmissibility in Y direction is 1.95, while the maximum vibration transmissibility in Z direction is 1.59.

The maximum vibration transmissibility is an important index for measuring the vibration reduction effect. The maximum vibration transmissibility=the maximum acceleration value measured on the test specimen (hard disk)/the acceleration value (1 g's here) measured on the test platform at the frequency of this point. The smaller the transmissibility is, the safer the electronic device, i.e., the hard disk is. For the response frequency, on a point where the acceleration value is largest on the test curve, the lower the response frequency is, the larger the safety zone of the electronic device, i.e., the hard disk, is. Therefore, it can be seen from Table 1 and FIG. 4 that the vibration reduction effect in X direction is the best; not only is the maximum transmissibility smaller, but also the response frequency corresponding to the point where the acceleration value is largest on the test curve is the lowest. In general, the vibration reduction effect of the vibration reduction device according to the present disclosure is excellent, and the response frequency is greatly reduced.

It can be seen that the vibration reduction device according to the present disclosure has an excellent vibration reduction effect. Certainly, for the vibration reduction connecting component 50 of the vibration reduction device 1 in certain specific embodiments shown in FIG. 1A to FIG. 1F, because the structures in X direction, Y direction and Z direction are not quite the same, the vibration reduction effects in X direction, Y direction and Z direction are slightly different. During use, those skilled in the art can perform arrangement according to vibration reduction needs in different directions.

The electronic equipment and/or the precision instrument furnished with the vibration reduction device according to the present disclosure can be loaded onto the mobile equipment, and connected with the mobile equipment such as vehicles and the like by means of fasteners such as screws, bolts and the like through the installing holes formed in the housing of the electronic equipment and/or the precision instrument, thereby realizing an excellent vibration reduction effect and providing better use experience of the electronic equipment and/or the precision instrument for users of the mobile equipment. Certainly, those skilled in the art can consider other modes of connecting the electronic equipment and/or the precision instrument with the mobile equipment, such as welding, riveting, bonding, and the like.

The specific embodiments of the present disclosure are described above with reference to the drawings, but these descriptions should not be understood as a limitation to the protection scope of the present disclosure. Different embodiments of the present disclosure can be combined or integrated according to any appropriate mode. Improvements or variations made on the above specific embodiments by those skilled in the art according to the instruction of the present disclosure will be covered within the protection scope of the present disclosure.

The invention claimed is:

1. A vibration reduction device, comprising:
a first fixing component, which is a frame structure;
a second fixing component arranged in the center or near the center position of said first fixing component; and
a vibration reduction connecting component positioned between the first fixing component and the second fixing component and used for connecting both together, wherein said vibration reduction connecting component comprises: a vibration reduction connecting frame connected to said frame structure-, and an inverted U-shaped structure positioned in the vibration reduction connecting frame and connected to the lower part of said vibration reduction connecting frame through supporting legs; and moreover, said inverted U-shaped structure is connected with said second fixing component,
wherein said vibration reduction connecting component further comprises an external vibration reduction connecting piece disposed external to said frame structure and connected to said vibration reduction connecting frame.

2. The vibration reduction device of claim 1, wherein said first fixing component is a frame structure, and installing holes are respectively formed in the upper part and the lower part of said frame structure;
and said second fixing component is a column body having a through hole for installation.

3. The vibration reduction device of claim 1, wherein a center hole used for receiving said second fixing component is formed at the crown of said inverted U-shaped structure.

4. The vibration reduction device of claim 3, wherein at least one vibration reduction rib is formed on the end surface of one end or both ends of the side wall of said center hole.

5. The vibration reduction device of claim 3, wherein at least one vibration reduction rib is formed on the end surface of one end or both ends of said vibration reduction connecting frame.

6. The vibration reduction device of claim 3, wherein the frame structure of said first fixing component is roughly circular, and the vibration reduction connecting frame of said vibration reduction connecting component is also roughly circular; and meanwhile, through-holes are formed in the upper part and the lower part of said vibration reduction connecting frame in positions corresponding to installing holes of said frame structure.

7. The vibration reduction device of claim 3, wherein the frame structure of said first fixing component is roughly circular, and the vibration reduction connecting frame of said vibration reduction connecting component is a two-segment arc structure connected with the supporting legs of said inverted U-shaped structure.

8. The vibration reduction device of claim 3, wherein said external vibration reduction connecting piece is connected to said vibration reduction connecting frame through a plurality of middle connecting columns which penetrate through holes formed in the frame structure of said first fixing component.

9. The vibration reduction device of claim 8, wherein said first fixing component and said second fixing component are made of material selected from metal, alloy, plastic and rubber, and said vibration reduction connecting component is made of material selected from elastic metal and elastic rubber.

10. An electronic device, comprising:
an electronic device body;
a housing used for accommodating said electronic device body;
and the vibration reduction device of claim 1, wherein said vibration reduction device is arranged between said electronic device body and said housing.

11. The vibration reduction device of claim 1, wherein said second fixing component is made of a first material, and said vibration reduction connecting component is made of a second material, the first material harder than the second material.

12. The vibration reduction device of claim 1, wherein said first fixing component and said second fixing component is made of a metal or alloy, and said vibration reduction connecting component is made of rubber.

13. The vibration reduction device of claim 1, wherein said external vibration reduction connecting piece substantially conforms to opposite lateral sides of said first fixing component.

* * * * *